United States Patent
Katzman et al.

(10) Patent No.: US 12,416,820 B2
(45) Date of Patent: *Sep. 16, 2025

(54) PROGRESSIVE LENS AND MANUFACTURE THEREOF

(71) Applicant: ADDON OPTICS LTD., Kadima-Zoran (IL)

(72) Inventors: Dan Katzman, Givat Ela (IL); Haim Engler, Maale Adumim (IL)

(73) Assignee: ADDON OPTICS LTD., Kadima-Zoran (IL)

( * ) Notice: Subject to any disclaimer, the term of this patent is extended or adjusted under 35 U.S.C. 154(b) by 193 days.

This patent is subject to a terminal disclaimer.

(21) Appl. No.: 17/763,351

(22) PCT Filed: Sep. 22, 2020

(86) PCT No.: PCT/IB2020/058844
§ 371 (c)(1),
(2) Date: Mar. 24, 2022

(87) PCT Pub. No.: WO2021/059128
PCT Pub. Date: Apr. 1, 2021

(65) Prior Publication Data
US 2022/0373825 A1    Nov. 24, 2022

Related U.S. Application Data

(63) Continuation-in-part of application No. 16/718,448, filed on Dec. 18, 2019, now Pat. No. 11,378,821.
(Continued)

(51) Int. Cl.
G02C 7/06      (2006.01)
B29D 11/00     (2006.01)
G02C 7/08      (2006.01)

(52) U.S. Cl.
CPC ........ *G02C 7/063* (2013.01); *B29D 11/00028* (2013.01); *G02C 7/061* (2013.01); *G02C 7/086* (2013.01)

(58) Field of Classification Search
CPC ...... G02C 7/066; G02C 7/022; B29C 45/0001
(Continued)

(56) References Cited

U.S. PATENT DOCUMENTS 2,511,329 A    6/1950  Edward
2,759,394 A    8/1956  Evans
(Continued)

FOREIGN PATENT DOCUMENTS

CA    2360230 A1    7/2000
CN    101467076 A   6/2009
(Continued)

OTHER PUBLICATIONS

Corrected Notice of Allowance for U.S. Appl. No. 16/898,954 mailed Mar. 31, 2023.
(Continued)

*Primary Examiner* — Darryl J Collins
(74) *Attorney, Agent, or Firm* — Ballard Spahr LLP

(57) ABSTRACT

Apparatus and methods are described including a progressive lens (20) that is configured to provide a far-vision correction and a near-vision correction. The progressive lens includes a single-focus, far-vision corrective lens (22) that is configured to provide only a portion of the far-vision correction, and a film (24) coupled to the single-focus, far-vision corrective lens (22). The film (24) defines a far-vision corrective portion (26) that is configured to provide the remainder of the far-vision correction, a near-vision corrective portion (28) that is configured to provide additive near-vision correction, and an intermediate portion (30) in which the film transitions between the far-vision corrective (Continued)

portion and the near-vision corrective portion. Other applications are also described.

26 Claims, 4 Drawing Sheets

Related U.S. Application Data

(60) Provisional application No. 62/906,157, filed on Sep. 26, 2019.

(58) Field of Classification Search
USPC .................................................. 351/159.42
See application file for complete search history.

(56) References Cited

U.S. PATENT DOCUMENTS

| | | | |
|---|---|---|---|
| 3,628,854 | A | 12/1971 | Jampolsky |
| 3,877,798 | A | 4/1975 | Tolar et al. |
| 3,904,281 | A | 9/1975 | Jampolsky |
| 4,173,606 | A | 11/1979 | Kalal et al. |
| 4,547,049 | A | 10/1985 | Cotie |
| 4,650,275 | A | 3/1987 | Jones |
| 4,781,452 | A | 11/1988 | Ace |
| 4,859,261 | A | 8/1989 | Ace |
| 4,867,553 | A | 9/1989 | Frieder |
| 4,883,548 | A | 11/1989 | Onoki |
| 4,921,626 | A | 5/1990 | Rhodenbaugh |
| 4,923,758 | A | 5/1990 | Marks et al. |
| 4,969,729 | A | 11/1990 | Merle |
| 5,420,651 | A | 5/1995 | Kamppeter |
| 5,478,824 | A | 12/1995 | Burns et al. |
| 5,617,153 | A | 4/1997 | Allen et al. |
| 5,677,751 | A | 10/1997 | Gerber |
| 5,748,279 | A * | 5/1998 | Glanzbergh ............. G02C 9/00 351/45 |
| 5,764,333 | A | 6/1998 | Somsel |
| 5,790,227 | A | 8/1998 | Rorabaugh |
| 5,926,250 | A | 7/1999 | Mukaiyama et al. |
| 6,019,470 | A | 2/2000 | Mukaiyama et al. |
| 6,027,214 | A * | 2/2000 | Graham ................. G02C 7/086 351/41 |
| 6,139,148 | A | 10/2000 | Menezes |
| 6,170,952 | B1 * | 1/2001 | La Haye ............. C08G 18/758 351/159.41 |
| 6,244,705 | B1 * | 6/2001 | Ledbetter ................. G02C 9/00 351/41 |
| 6,258,218 | B1 | 7/2001 | Burton |
| 6,290,354 | B1 | 9/2001 | Safran |
| 6,807,824 | B1 | 10/2004 | Miwa |
| 6,881,269 | B2 | 4/2005 | Matsuzawa et al. |
| 7,036,929 | B1 * | 5/2006 | Harvey ................. G02C 7/086 351/159.02 |
| 7,250,197 | B2 | 7/2007 | Rastogi et al. |
| 7,934,831 | B2 | 5/2011 | Spivey et al. |
| 8,042,941 | B2 | 10/2011 | Alonso et al. |
| 8,202,392 | B2 | 6/2012 | Jiang et al. |
| 8,702,230 | B2 * | 4/2014 | Yi ......................... G02C 7/086 351/45 |
| 8,714,739 | B2 * | 5/2014 | Rouault De Coligny ................. G02C 13/00 351/178 |
| 9,156,213 | B2 | 10/2015 | Qiu et al. |
| 9,529,118 | B2 | 12/2016 | Ryu et al. |
| 9,733,489 | B2 | 8/2017 | Paille et al. |
| 9,915,830 | B2 * | 3/2018 | Curley ................... G02C 9/00 |
| 9,995,948 | B2 * | 6/2018 | Arieli ..................... G02B 1/14 |
| 10,126,571 | B2 * | 11/2018 | Junkins ................. G02C 7/086 |
| 10,437,309 | B2 | 10/2019 | Milford |
| 10,712,591 | B2 | 7/2020 | Arieli et al. |
| 11,745,476 | B2 | 9/2023 | Katzman et al. |
| 2002/0149739 | A1 | 10/2002 | Perrott et al. |
| 2003/0017340 | A1 | 1/2003 | Jiang et al. |
| 2003/0048405 | A1 | 3/2003 | Rivera |
| 2004/0055994 | A1 | 3/2004 | Miwa |
| 2004/0126587 | A1 | 7/2004 | Maki et al. |
| 2007/0121058 | A1 * | 5/2007 | Chuang ................. G02C 9/00 351/54 |
| 2009/0004478 | A1 | 1/2009 | Baetzold et al. |
| 2009/0046242 | A1 | 2/2009 | Nicolson et al. |
| 2010/0007846 | A1 | 1/2010 | Fermigier et al. |
| 2010/0007847 | A1 | 1/2010 | Cano et al. |
| 2010/0193112 | A1 | 8/2010 | Bovet et al. |
| 2010/0208197 | A1 | 8/2010 | Carimalo et al. |
| 2010/0238400 | A1 | 9/2010 | Volk |
| 2010/0239776 | A1 | 9/2010 | Yajima et al. |
| 2010/0259717 | A1 | 10/2010 | Fermigier et al. |
| 2011/0181828 | A1 | 7/2011 | Yi et al. |
| 2012/0013980 | A1 | 1/2012 | Begon |
| 2013/0154906 | A1 | 6/2013 | Braun et al. |
| 2015/0049306 | A1 | 2/2015 | Haddadi et al. |
| 2015/0286070 | A1 | 10/2015 | Aikawa |
| 2016/0161761 | A1 | 6/2016 | Quere et al. |
| 2016/0178934 | A1 | 6/2016 | Curley et al. |
| 2016/0311184 | A1 | 10/2016 | Gourraud |
| 2017/0059885 | A1 | 3/2017 | Patel |
| 2017/0059886 | A1 | 3/2017 | Fayolle et al. |
| 2017/0156587 | A1 | 6/2017 | Rifai et al. |
| 2017/0188813 | A1 | 7/2017 | Arnold et al. |
| 2017/0235130 | A1 | 8/2017 | Baker |
| 2017/0269379 | A1 * | 9/2017 | Arieli ..................... G02C 7/021 |
| 2017/0299886 | A1 | 10/2017 | Carmon et al. |
| 2018/0077992 | A1 | 3/2018 | Kataoka et al. |
| 2018/0259794 | A1 | 9/2018 | Arieli et al. |
| 2019/0212564 | A1 | 7/2019 | Rousseau et al. |
| 2019/0324290 | A1 | 10/2019 | El-hajal et al. |
| 2020/0285074 | A1 | 9/2020 | Zimanyi |
| 2020/0301171 | A1 | 9/2020 | Arieli et al. |
| 2021/0387303 | A1 | 12/2021 | Katzman et al. |
| 2022/0244542 | A1 | 8/2022 | Bouchier et al. |
| 2022/0326547 | A1 | 10/2022 | Bakaraju |
| 2023/0127754 | A1 | 4/2023 | Arkin et al. |

FOREIGN PATENT DOCUMENTS

| | | |
|---|---|---|
| CN | 101743501 A | 6/2010 |
| CN | 103197436 A | 7/2013 |
| CN | 106461978 A | 2/2017 |
| CN | 206725875 U | 12/2017 |
| CN | 110515219 A | 11/2019 |
| EP | 1870738 A2 | 12/2007 |
| EP | 4159423 A1 | 4/2023 |
| EP | 3615318 B1 | 8/2023 |
| GB | 1100148 A | 1/1968 |
| JP | S4870647 A | 9/1973 |
| JP | S5336252 B1 | 10/1978 |
| JP | 01026818 A | 1/1989 |
| JP | S6426818 U | 2/1989 |
| JP | 04120927 U | 10/1992 |
| JP | H058534 U | 2/1993 |
| JP | H09154479 A | 6/1997 |
| JP | 2005249842 A | 9/2005 |
| JP | 2007102057 A | 4/2007 |
| JP | 2010033070 A | 2/2010 |
| JP | 2010507834 A | 3/2010 |
| JP | 2010508552 A | 3/2010 |
| JP | 2012128458 A | 7/2012 |
| JP | 2014200943 A | 10/2014 |
| JP | 2017516161 A | 6/2017 |
| JP | 2022537025 A | 8/2022 |
| WO | 0071330 A1 | 11/2000 |
| WO | 0105578 A1 | 1/2001 |
| WO | 2003023495 A2 | 3/2003 |
| WO | 2009103359 A1 | 8/2009 |
| WO | 2013169987 A1 | 11/2013 |
| WO | 2014084339 A1 | 6/2014 |
| WO | 2015124574 A1 | 8/2015 |
| WO | WO-2015173797 A1 * | 11/2015 ............... G02B 1/14 |
| WO | 2017042612 A1 | 3/2017 |
| WO | 2019219627 A1 | 11/2019 |
| WO | 2021059128 A1 | 4/2021 |

(56) References Cited

FOREIGN PATENT DOCUMENTS

| WO | 2021161125 A1 | 8/2021 |
|---|---|---|
| WO | 2021198822 A1 | 10/2021 |
| WO | 2024100506 A1 | 5/2024 |

OTHER PUBLICATIONS

Examination Report for Indian Application No. 202247051124 mailed Feb. 27, 2023.
Examination Report for Indian Application No. 202248053824 mailed Mar. 1, 2023.
Extended European Search Report for European Application No. 22206182.2 mailed Feb. 27, 2023.
International Search Report and Written Opinion from International Application No. PCT/IB2022/057416 mailed Nov. 22, 2022.
Issue Notification for U.S. Appl. No. 16/898,954 mailed Jul. 19, 2023.
Notice of Allowance for U.S. Appl. No. 16/898,954 mailed on Mar. 20, 2023.
Corrected Notice of Allowability for U.S. Appl. No. 16/718,448 mailed Jun. 2, 2022.
Issue Notification for U.S. Appl. No. 16/718,448 mailed Jun. 15, 2022.
Notice of Allowance for U.S. Appl. No. 16/718,448 mailed Mar. 30, 2022.
Office Action for Brazilian Application No. 11 2016 026162 3 mailed Feb. 28, 2022.
Decision of Dismissal of Amendment for Japanese Application No. 2017-51246 mailed Aug. 31, 2020.
Decision of Rejection for Chinese Application No. 201580029313.2 mailed Mar. 11, 2020.
Decision of Rejection for Japanese Application No. 2017-51246 mailed Aug. 20, 2020.
Decision to Refuse for European Application No. 15793232.8 mailed Jan. 22, 2019.
Examination Report for Australian Application No. 201260773 mailed Jun. 6, 2019.
Examination Report for Australian Application No. 2020201126 mailed Feb. 11, 2021.
Examination Report for European Application No. 15793232.8 mailed Sep. 15, 2017.
Examination Report for Indian Application No. 201627037817 mailed Oct. 31, 2020.
Extended European Search Report for European Application No. 15793232.8 mailed May 24, 2017.
International Search Report and Written Opinion from International Application No. PCT/IB2020/058844 mailed Dec. 15, 2020.
International Search Report and Written Opinion from International Application No. PCT/IB2021/050759 mailed Jul. 16, 2021.
International Search Report and Written Opinion from International Application No. PCT/IB2021/052164 mailed Sep. 22, 2021.
International Search Report and Written Opinion from International Application No. PCT/IL2015/050475 mailed Sep. 16, 2015.
Invitation to pay Additional Fees for International Application No. PCT/IB2021/050759 mailed Apr. 30, 2021.
Invitation to Pay Additional Fees for International Application No. PCT/IB2021/052164 mailed Jun. 28, 2021.
Issue Notification for U.S. Appl. No. 15/310,356 mailed May 23, 2018.
Minutes of Oral Proceedings for European Application No. 15793232.8 mailed Nov. 27, 2018.
Non Final Office Action for U.S. Appl. No. 16/718,448 Mailed Dec. 17, 2021.
Non-Final Office Action for U.S. Appl. No. 15/976,669 mailed Sep. 9, 2019.
Notice of Acceptance for Australian Application No. 2015260773 mailed Nov. 13, 2019.
Notice of Allowance for U.S. Appl. No. 15/310,356 mailed Apr. 16, 2018.
Notice of Allowance for U.S. Appl. No. 15/310,356 mailed Jan. 26, 2018.
Notice of Allowance for U.S. Appl. No. 15/976,669 mailed Jan. 10, 2020.
Notice of Allowance for U.S. Appl. No. 15/976,669 mailed Jun. 4, 2020.
Notice of Re-examination of Chinese Application No. 201580029313.2 mailed Jul. 29, 2021.
Office Action for Chinese Application No. 201580029313.2 mailed May 22, 2019.
Office Action for Chinese Application No. 201580029313.2 mailed Oct. 3, 2019.
Office Action for Chinese Application No. 201580029313.2 mailed Sep. 3, 2018.
Office Action for Japanese Application No. 2017512464 mailed Feb. 27, 2019.
Office Action for Japanese Application No. 2017-512464 mailed Nov. 25, 2019.
Result of Telephone Consultation for European Application No. 15793232.8 mailed Nov. 5, 2018.
Summons to Attend Oral Hearing for European Application No. 15793232.8 mailed Apr. 10, 2018.
Summons to Attend Oral Hearing for European Application No. 15793232.8 mailed May 27, 2021.
U.S. Appl. No. 15/310,356, filed Nov. 10, 2016.
U.S. Appl. No. 15/976,669, filed May 10, 2018.
U.S. Appl. No. 16/718,448, filed Dec. 18, 2019.
U.S. Appl. No. 61/991,514, filed May 11, 2014.
U.S. Appl. No. 62/906,157, filed Sep. 26, 2019.
Written Opinion from International Application No. PCT/IB2021/052164 mailed Feb. 9, 2022.
Chou, et al., "Effect of Multiple Antireflection Coatings on Impact Resistance of Hoya Phoenix Spectacle Lenses", Optom Exp Clin, 2006, pp. 86-89.
Meslin, "Opthalmic Optics: Materials and Treatments", Europe Essilor Academy, 2010, 68.
Non-Final Office Action for U.S. Appl. No. 16/898,954 mailed Oct. 27, 2022.
U.S. Appl. No. 17/904,036, filed Aug. 11, 2022.
U.S. Appl. No. 17/904,269, filed Aug. 15, 2022.
U.S. Appl. No. 18/051,140, filed Oct. 31, 2022.
U.S. Appl. No. 62/977,313, filed Feb. 16, 2020.
U.S. Appl. No. 63/002,388, filed Mar. 31, 2020.
U.S. Appl. No. 63/002,393, filed Mar. 31, 2020.
Examination Report for Indian Patent Application No. 2022215264 mailed Jul. 24, 2023.
Hearing Notice for Indian Application No. 201627037817 mailed Nov. 16, 2023.
Office Action for Canadian Application No. 3,151,806 mailed Aug. 9, 2023.
Office Action for Canadian Application No. 3,170,681 mailed Oct. 20, 2023.
Office Action for Chinese Application No. 202080067832.9 mailed Jul. 1, 2023.
Decision of Rejection for Chinese Application No. 202080067832.9 mailed Dec. 27, 2023.
International Search Report and Written Opinion from International Application No. PCT/IB2023/061107 mailed Feb. 27, 2024.
Office Action for Japanese Application No. 2022-509599 mailed Feb. 19, 2024.
U.S. Appl. No. 63/233,567, filed Aug. 16, 2021.
Office Action for Canadian Application No. 3,151,806 mailed Jun. 12, 2024.
Office Action for Canadian Application No. 3,170,681 mailed Aug. 6, 2024.
Office Action for Chinese Application No. 202080067832.9 mailed Oct. 18, 2024.
Office Action for Japanese Application No. 2022-509599 mailed Sep. 11, 2024.
Decision on Reexamination Rejection for Chinese Application No. 202080067832.9 mailed Dec. 6, 2024.
Examination Report for Australian Application No. 2020351724 mailed Apr. 4, 2025.

(56) References Cited

OTHER PUBLICATIONS

Examination Report for European Application No. 20786059.4 mailed Mar. 11, 2025.
International Search Report and Written Opinion from International Application No. PCT/IB2024/059588 mailed Feb. 24, 2025.
Non-Final Office Action for U.S. Appl. No. 17/904,036 mailed Apr. 23, 2025.
Non-Final Office Action for U.S. Appl. No. 17/904,269 mailed Apr. 3, 2025.
Office Action for Chinese Application No. 202180019255.0 mailed Mar. 18, 2025.
Office Action for Korean Application No. 10-2022-7014044 mailed Feb. 28, 2025.
Examination Report for Indian Application No. 202247008235 mailed Jun. 30, 2025.
Office Action for Canadian Application No. 3,151,806 mailed Jul. 15, 2025.

* cited by examiner

PROGRESSIVE LENS AND MANUFACTURE THEREOF

CROSS-REFERENCE TO RELATED APPLICATIONS

The present application is a US national phase of International Application PCT/IB2020/058844 to Katzman, filed Sep. 22, 2020, which:
claims priority from U.S. Provisional Patent Application No. 62/906,157 to Katzman, filed Sep. 26, 2019, entitled "Apparatus and method for manufacturing a progressive lens," and
claims priority and is a continuation in part of U.S. patent application Ser. No. 16/718,448 to Katzman, filed Dec. 18, 2019, entitled "A progressive lens and method of manufacture thereof."

FIELD OF EMBODIMENTS OF THE INVENTION

Some applications of the present invention generally relate to ophthalmic lenses. In particular, some applications relate to manufacturing a progressive lens using a single-focus rigid lens and a film that is coupled to the lens.

BACKGROUND

Presbyopia is a condition that gradually affects most of the population over age 40. The condition results in progressively worsening ability to focus clearly on close objects. Presbyopia is usually treated with multifocal eyeglasses, progressive eyeglasses or contact lenses, since laser-assisted in situ keratomileusis (i.e., LASIK) and other types of surgery are unsuitable for treating this condition.

Corrective lenses are used in eyeglasses to correct presbyopia and other disorders of accommodation. Many people who suffer from presbyopia, additionally suffer from myopia (i.e., near-sightedness). A basic solution for such people is the use of multifocal spectacle lenses. Multifocal spectacle lenses contain two or more lens powers, with each power being suitable for objects that are at respective distances. Bifocals contain two lens powers; trifocals contain three. Progressive spectacle lenses are characterized by a gradient of increasing lens power. The gradient starts at the wearer's distance prescription and reaches a maximum addition power, or the full reading addition, in the lower portion of the lens. The addition in the middle of the lens usually enables clear vision in intermediate ranges, such as reading text on a computer screen. The length of the progressive power gradient on the lens surface depends on the design of the lens, with a final addition power typically being between 0.50 and 3.50 Diopters. The addition value prescribed depends on the level of presbyopia of the patient.

Multifocal and progressive lenses are typically relatively expensive. A significant contributing factor to the high cost of multifocal and progressive lenses is the fact that there is a huge number of (several million) possible prescription combinations, when accounting for near-vision correction, far-vision correction, astigmatism, and angle of astigmatism. The large number of possible combination means that most prescriptions cannot be held in stock, but rather must be manufactured on a bespoke basis based on the patient's needs.

SUMMARY OF EMBODIMENTS

In accordance with some applications of the present invention, a progressive lens that is configured to provide a far-vision correction and a near-vision correction, includes a single-focus, far-vision corrective lens and a film coupled to the single-focus, far-vision corrective lens. Typically, the single-focus, far-vision corrective lens is configured to provide only a portion of the far-vision correction, and the film is configured to provide the remainder of the far-vision correction. The film is additionally configured to provide an additive near-vision correction within a near-vision corrective portion of the film, and to define an intermediate portion in which the film transitions between the near-vision corrective portion and a far-vision corrective portion, in which the film provides its portion of the far-vision corrective optical power. Typically, the transition of the film between the far-vision corrective portion and the near-vision corrective portion is a smooth transition, with substantially no noticeable boundaries between regions having different optical powers.

The single-focus lens is typically a rigid stock lens. In accordance with the above description, typically, the progressive functionalities of the "lens-film combination" (i.e., the combination of the lens and the film) are provided by the film. Separating the corrective functionalities in this manner typically allows a large number of prescriptions to be provided using a relatively small stock of lenses and films, e.g., as described in U.S. Pat. No. 9,995,948 to Arieli, which is incorporated herein by reference. The film is typically flexible (at least under certain conditions), such that it is able to conform to the shapes and/or sizes of a variety of different rigid lenses, but yet maintain its optical characteristics. Typically, this further reduces the stock of lenses and of films that is required to be held relative to if the film were only able to be combined with lenses having particular shapes and/or sizes. For some applications, the film is only flexible under given conditions (e.g., when the film is heated to above a given temperature), whereas, under typical ambient conditions (e.g., at a temperature of less than 50 degrees Celsius), the film is substantially rigid, such that the film has the characteristics of a rigid lens. Typically, the given conditions are applied to the film during the manufacture of the lens-film combination, and, in particular, when the film is coupled to the single-focus, far-vision corrective lens. Thus, the flexibility of the film permits the film to conform with the shape of the single-focus, far-vision corrective lens. For example, the film may be heated to above a given temperature during the manufacture of the lens-film combination, and, in particular, when the film is coupled to the single-focus, far-vision corrective lens. Typically, even when placed under the given conditions (e.g., when heated above the given temperature), the film is configured to maintain its optical characteristics. Subsequently, when the lens-film combination is placed under ambient conditions (e.g., a temperature of less than 50 degrees Celsius), the film assumes a rigid state.

Typically, if a user requires a far-vision correction of X diopters, then a single-focus lens will be selected for the lens-film combination that does not provide the full correction, but rather provides a Y diopter correction. The film is typically configured to provide the remainder of the far-vision correction (i.e., the difference between X and Y). In the near-vision portion of the film (toward the bottom of the film), the film provides the additive optical power that is required for near-vision, and along the intermediate portion, the film provides progressive optical power, by transitioning (typically, smoothly, as described hereinabove) between the far-vision corrective portion and the near-vision corrective portion. This is in contrast to an alternative type of lens-film combination in which the lens is used to provide the full far-vision correction of X diopters. In such cases, the film would be designed as a plano lens in the far-vision portion.

Typically, using the film to provide a portion of the far-vision correction provides a number of advantages relative to if the entire far vision correction were to be provided solely by the single-focus lens. If the film is used to provide the near-vision and progressive functionalities of the combination without providing any of the far-vision correction, then (even after performing industry-standard, prism-thinning procedures by removing a prism from the film), the film would have the structure of a typical positive-prescription lens. Such a lens is thinner at its edges and thicker at its center, and the larger the diameter of the lens (or the film, in this case) the thicker the center of the lens. By contrast, when the film is used to provide some of the far vision correction (in accordance with some applications of the present invention), the film is typically designed to have a more uniform thickness, as described in more detail hereinbelow. Further typically, the overall lens-film combination is designed to have a thinner overall thickness than if the entire far vision correction were to be provided by the single-focus lens. Still further typically, the overall lens-film combination is designed to have a relatively uniform thickness across the area of the lens-film combination, such that, even if the diameter of the lens-film combination increases, the thickness of the combination does not increase substantially at either its edges or at its center.

For cosmetic reasons, all of the features of the lens-film combination described above are typically desirable. In addition, such features are typically desirable, in order to provide functional eyebrow clearance and to provide compatibility of the lens-film combination with the widest possible diversity of frame styles, shapes and sizes.

In addition, by virtue of the film having a more uniform thickness, it is typically possible to manufacture the film using a melted thermoplastic material and injection molding techniques, which would otherwise be difficult to implement. This is because if the film were to have the structure of a typical positive-prescription lens (i.e., thinner at its edges and thicker at its center), the mold cavity would have narrow edges and a wider center. The flow profile of the thermoplastic material flowing through such a cavity is likely to create stress marks, which typically remain even after the material cools down, and thus be rendered unacceptable for ophthalmic applications. Moreover, in order to attain a reasonable thickness at the center of the film, the inlet into the cavity needs to be very narrow, and it is typically challenging to inject the melted thermoplastic material through a narrow inlet. By contrast, the mold cavity that is used to manufacture the film of the present application (which has substantially uniform thickness) is defined by substantially parallel cavity walls. A thermoplastic material will typically flow smoothly through such a cavity, such that the film will be produced without stress marks. For some applications, the film having a more uniform thickness facilitates simpler manufacturing of the film when using other manufacturing methods, such as casting and/or stamping methods (e.g., using thermoplastic materials and/or thermosetting materials).

In the present application, the term "film" should be interpreted as meaning a relatively thin material that is at least partially flexible at least under certain conditions. As described hereinabove, for some applications, the film is only flexible under given conditions (which are typically applied to the film during the manufacture of the lens-film combination), whereas, under typical ambient conditions, the film is substantially rigid, such that the film has the characteristics of a rigid lens.

There is therefore provided, in accordance with some applications of the present invention, apparatus including:
 a progressive lens that is configured to provide a far-vision correction and a near-vision correction, the progressive lens including:
 a single-focus, far-vision corrective lens that is configured to provide only a portion of the far-vision correction; and
 a film coupled to the single-focus, far-vision corrective lens, the film being configured to define:
  a far-vision corrective portion that is configured to provide the remainder of the far-vision correction;
  a near-vision corrective portion that is configured to provide additive near-vision correction; and
  an intermediate portion in which the film transitions between the far-vision corrective portion and the near-vision corrective portion.

In some applications, the single-focus, far-vision corrective lens is rigid. In some applications, the film includes a flexible film. In some applications, the film is configured to be flexible under given conditions and is configured to be rigid, such as to have characteristics of a rigid lens, under typical ambient conditions. In some applications, the film is configured to be flexible above a given temperature and is configured to be rigid, such as to have characteristics of a rigid lens, at a temperature of below 50 degrees Celsius.

In some applications, the far-vision corrective portion of the film is configured to provide a portion of the far-vision correction such that a thickness of the film is substantially uniform. In some applications, the far-vision corrective portion of the film is configured to provide a portion of the far-vision correction such that a ratio of a center thickness of the film to an edge thickness of the film is between 1:2 and 2:1, when a diameter of the film is greater than or equal to 70 mm. In some applications, the far-vision corrective portion of the film is configured to provide a portion of the far-vision correction such that a ratio of a center thickness of the film to an edge thickness of the film is between 1:1.6 and 1.6:1, when a diameter of the film is greater than or equal to 40 mm.

In some applications, the far-vision corrective portion of the film is configured to provide a far-vision correction such that a far-vision correction that is provided by the single-focus, far-vision corrective lens is an integer multiple of 0.25 Diopters.

In some applications, the far-vision corrective portion of the film is configured to provide a portion of the far-vision correction such that an edge thickness of the film is at least 0.1 mm. In some applications, the far-vision corrective portion of the film is configured to provide a portion of the far-vision correction such that an edge thickness of the film is at least 0.3 mm. In some applications, the far-vision corrective portion of the film is configured to provide a portion of the far-vision correction such that an edge thickness of the film is at least 0.3 mm, even when a center thickness of the film is less than or equal to 0.7 mm. In some applications, the far-vision corrective portion of the film is configured to provide a portion of the far-vision correction such that an edge thickness of the film is at least 0.3 mm, even when a diameter of the film is greater than or equal to 70 mm. In some applications, the far-vision corrective portion of the film is configured to provide a portion of the far-vision correction such that an edge thickness of the film is at least 0.3 mm, even when a center thickness of the film is less than or equal to 0.7 mm, and a diameter of the film is greater than or equal to 70 mm.

In some applications, the film includes a thermoplastic material, and the edge thickness of the film being greater than 0.1 mm facilitates manufacture of the film using injection molding of the thermoplastic material, when the thermoplastic material is in melted form. In some applications, the edge thickness of the film being greater than 0.1 mm facilitates manufacture of the film using injection molding of the thermoplastic material, when the thermoplastic material is in melted form, without introducing stress marks in the material.

There is further provided, in accordance with some applications of the present invention, a method including:

manufacturing a progressive lens that is configured to provide a far-vision correction and a near-vision correction, by:

configuring a film to define:

a far-vision corrective portion that is configured to provide a portion of the far-vision correction, a near-vision corrective portion that is configured to provide additive near-vision correction, and an intermediate portion in which the film transitions between the far-vision corrective portion and the near-vision corrective portion; and coupling the film to a single-focus, far-vision corrective lens that is configured to provide the remainder of the far-vision correction.

The present invention will be more fully understood from the following detailed description of embodiments thereof, taken together with the drawings, in which:

DETAILED DESCRIPTION OF EMBODIMENTS

Figure 1:
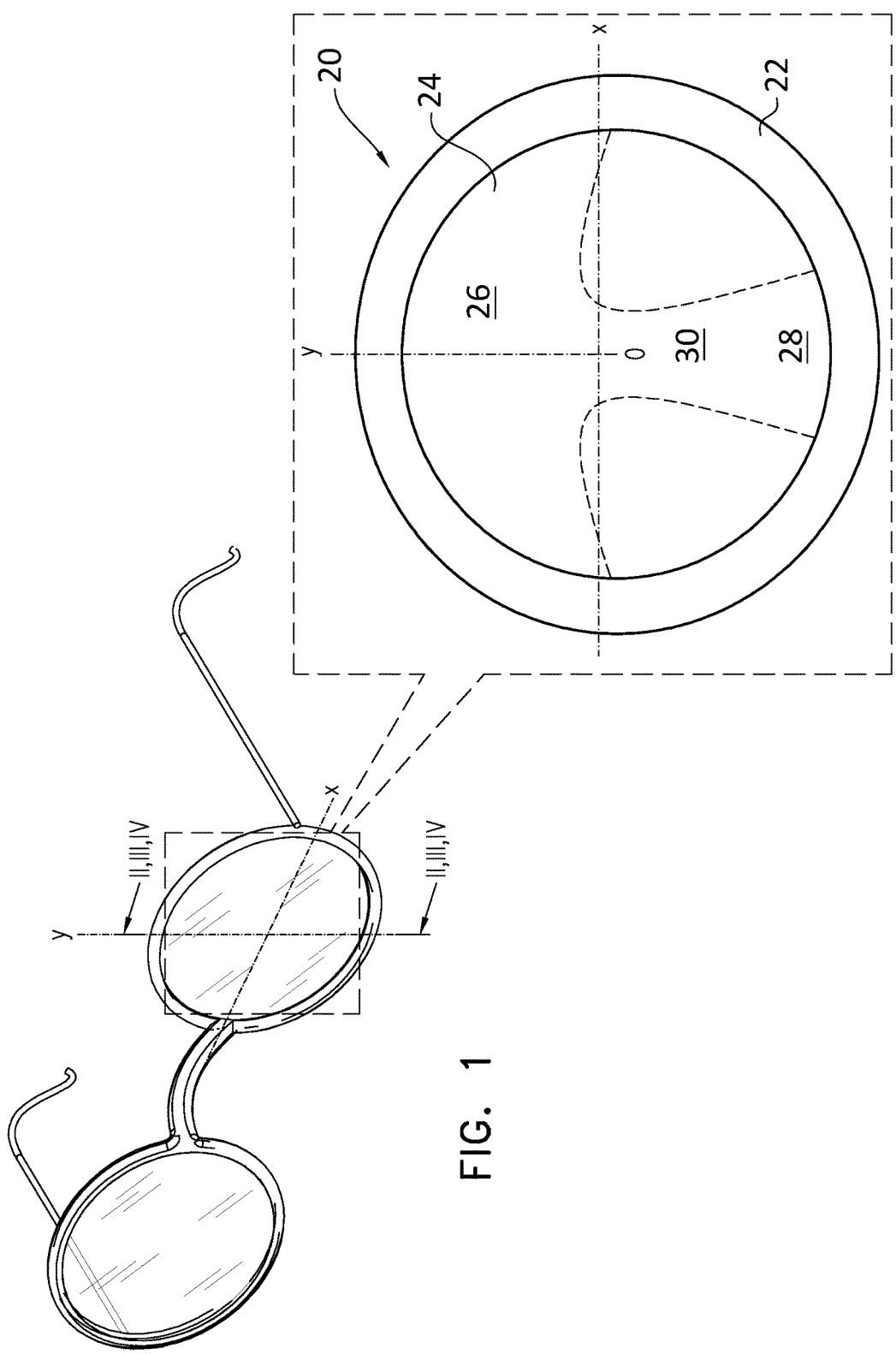
FIG. 1 is a schematic illustration of a progressive lens that is made of a lens-film combination, in accordance with some applications of the present invention.

Reference is now made to FIG. 1, which is a schematic illustration of a progressive lens 20 that is made of a lens-film combination, in accordance with some applications of the present invention. Progressive lens 20 is configured to provide far-vision correction and near-vision correction to a user suffering from both myopia and presbyopia. Typically, the progressive lens is incorporated into a pair a glasses (as shown). Progressive lens 20 includes a lens-film combination that comprises a single-focus, far-vision corrective lens 22 and a film 24 coupled to the single-focus, far-vision corrective lens. Typically, film 24 is coupled to the inner surface of single-focus lens 22 (i.e., the surface of the lens that is closer to the user's eyes when the lens is incorporated into glasses that are worn by the user). Alternatively, film 24 is coupled to the outer surface of single-focus lens 22 (i.e., the surface of the lens that is farther from the user's eyes when the lens is incorporated into glasses that are worn by the user). Typically, the film is coupled to the single-focus lens via an adhesive layer, and/or is coupled to the single-focus lens using alternative techniques, e.g., as described in U.S. Pat. No. 9,995,948 to Arieli, which is incorporated herein by reference.

Typically, single-focus lens 22 is configured to provide only a portion of the far-vision correction, and film 24 is configured to provide the remainder of the far-vision correction. The film is additionally configured to provide a near-vision additive correction within a near-vision corrective portion 28 of the film, and to define an intermediate portion 30 in which the film transitions (typically, smoothly, as described hereinabove) between the near-vision corrective portion, and a far-vision corrective portion 26, in which the film provides only its portion of the far-vision corrective optical power.

Single-focus lens 22 is typically a stock lens. In accordance with the above description, typically, the progressive functionalities of the lens-film combination are provided by the film. Separating the corrective functionalities in this manner typically allows a large number of prescriptions to be provided using a relatively small stock of lenses and films, e.g., as described in U.S. Pat. No. 9,995,948 to Arieli, which is incorporated herein by reference. The film is typically flexible (at least under certain conditions), such that it is able to conform to the shapes, sizes, and/or angle of a variety of different rigid lenses (including spherical and toric lenses), but yet maintain its optical characteristics. Typically, this further reduces the stock of lenses and of films that is required to be held relative to if the film were only able to be combined with lenses having particular shapes and/or sizes. For some applications, the film is only flexible under given conditions (e.g., when the film is heated to above a given temperature), whereas, under typical ambient conditions (e.g., at a temperature of less than 50 degrees Celsius), the film is substantially rigid, such that the film has the characteristics of a rigid lens. Typically, the given conditions are applied to the film during the manufacture of the lens-film combination, and, in particular, when the film is coupled to the single-focus, far-vision corrective lens. Thus, the flexibility of the film permits the film to conform with the shape of the single-focus, far-vision corrective lens. For example, the film may be heated to above a given temperature during the manufacture of the lens-film combination, and, in particular, when the film is coupled to the single-focus, far-vision corrective lens. Typically, even when placed under the given conditions (e.g., when heated above the given temperature), the film is configured to maintain its optical characteristics. Subsequently, when the lens-film combination is placed under ambient conditions (e.g., a temperature of less than 50 degrees Celsius), the film assumes a rigid state.

In the following section of the application, examples of lens-film combinations in which all of the far-vision corrective optical power is provided by the single-focus lens will be described with reference to FIGS. 2 and 3. Subsequently, an example of a lens-film combination in which a portion of the far-vision corrective optical power is provided by the film will be described with reference to FIG. 4. Certain advantages of having the film provide a portion of the far-vision corrective optical power will be described by comparing the example shown in FIG. 4 to the examples shown in FIGS. 2 and 3. However, while these advantages are noted, the scope of the present application includes lens-film combinations in which all of the far-vision corrective optical power is provided by the single-focus lens, in accordance with the general principles described with reference to FIGS. 2 and 3.

Figure 2:
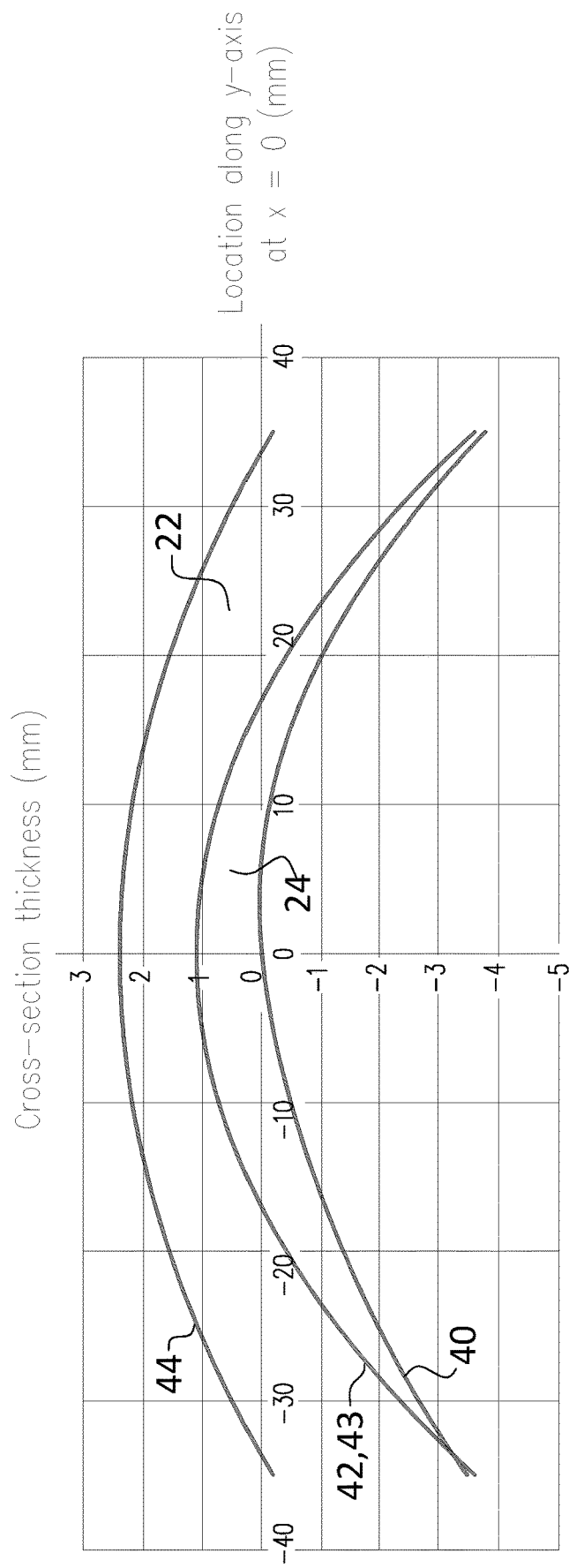
FIGS. 2 and 3 are schematic illustrations of cross-sections of lens-film combinations, in which the single-focus lens accounts for all of the far-vision corrective optical power and the film provides only the transitions between the far-vision corrective portion and a full near-vision additive correction without any impact on the far-vision correction, in accordance with some applications of the present invention.
Figure 3:
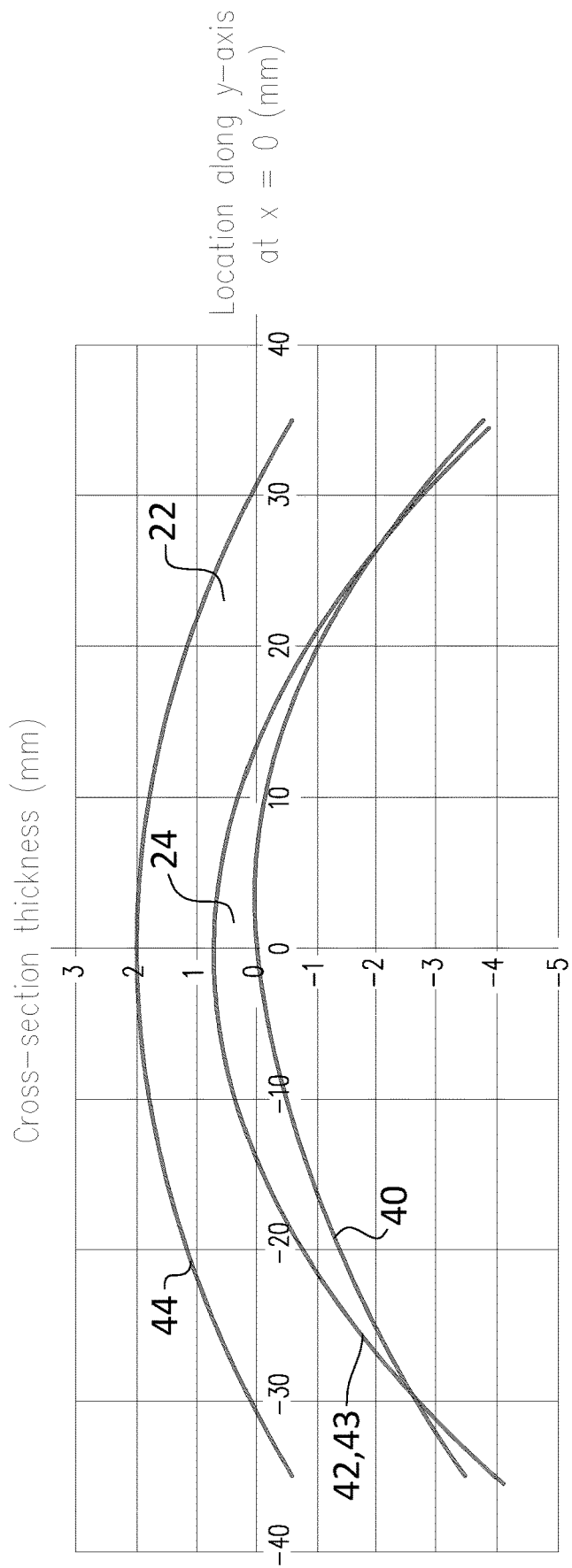

Examples of Lens-Film Combinations in which all of the Far-Vision Corrective Optical Power is Provided by the Lens Reference is now made to FIGS. 2 and 3, which are schematic illustrations of cross-sections of lens-film combinations (i.e., combinations of single-focus, far-vision corrective lens 22 and film 24), in which the lens accounts for all of the far-vision corrective optical power, in accordance with some applications of the present invention. If, for example, the desired far-vision optical power is −1.50 Diopters, then lens 22 would provide the full −1.50 Diopters, and the film would be a plano lens with an additive near-vision correction within the near-vision corrective portion of the film, and an intermediate portion in which the film transitions between the near-vision corrective portion and a far-vision non-corrective portion. In other words, the film would have no optical power in far-vision corrective portion 26 of the film.

The cross-sections shown in FIGS. 2 and 3 are taken along the vertical center line of the lens-film combination shown in FIG. 1 (i.e., along the y-axis, i.e., the line at which x=0 in FIG. 1). In the embodiments shown in FIGS. 2 and 3, the inner (concave) surface 40 of film 24 is shaped such as to provide the optical corrective functionalities of the film, while the outer (convex) surface 42 of the film 24 is spherical (or in some cases, aspherical), to conform with the existing concave inner surface of the single-focus lens. The far-vision corrective prescription of film 24 is provided by the difference between the curvatures of surface 40 and surface 42 at each point of measurement, which in this case is zero (the film being a plano film with no additive optical power in the far-vision region). Surface 43 is the inner (concave) surface of lens 22. Since film 24 is typically flexible and surface 42 of the film is coupled to surface 43, the convex curvature of surface 42 typically conforms with the concave curvature of surface 43. Surface 44 is the outer (convex) surface of the lens 22. The far-vision corrective prescription of lens 22 is provided by the difference between the curvatures of surface 43 and surface 44, at each point of measurement.

As shown in FIGS. 2 and 3, film 24 has the structure of a positive-prescription corrective lens, the lens being thinner at the edges and thicker at the center.

FIG. 2 shows an example in which the thickness of film 24 at its center (i.e., its center thickness) is 1.1 mm, and the single-focus lens and the film each have a refractive index of 1.53. Examples of parameters of such a lens-film combination are provided in Tables 1-5, which are presented in the Appendix to the specification. It is noted that some of the dimensions presented in Tables 1-5 are negative, which is physically impossible. This example is nevertheless presented in order to convey the point that indeed it is impossible to construct a lens-film combination with certain constraints.

Table 1 (presented in the Appendix) indicates the parameters for the outer (convex) surface 42 of film 24, and the center thickness of the film.

Table 2 (presented in the Appendix) indicates the edge thickness of film 24, assuming a film diameter of 60 mm. It shows that when applying a center thickness of 1.1 mm, the edge thickness at ±30 mm comes to about 0.3 mm, which is very difficult to achieve in real-world manufacturing.

Table 3 (presented in the Appendix) indicates the edge thickness of film 24, assuming a film diameter of 70 mm. Table 3 shows that for a film with a diameter of 70 mm and a center thickness at 1.1 mm, the edge thickness becomes below 0.3 mm at one edge and negative at the other edge, indicating that it is impossible to manufacture a film with such characteristics.

Table 4 (presented in the Appendix) indicates the convex radius of surface 44 of lens 22 as well as the center thickness of the lens, with the lens having a prescription of −1.75 Diopters. It is noted that, if the single-focus lens has a base 4.00 Diopters concave curvature, then in order to provide a −1.75 Diopters prescription, the lens needs to have a convex curvature of 2.25 Diopters. Using the thin-lens equation, for a lens having a refractive index of 1.53, the radius may be approximated by dividing 530 mm by the convex curvature. Accordingly, the radius for the convex side will be 530/2.25=235.56 mm.

Table 5 (presented in the Appendix) indicates the center thickness as well as the edge thickness, of the lens-film combination in two cases: (a) for a lens-film diameter of 60 mm, and (b) for a lens-film diameter of 70 mm. It may be observed that the edge thickness increases as the diameter increases. It is noted that Table 5 is theoretical, since in some cases the total thickness is made up of a positive thickness (for the single-focus lens) and a negative thickness (for the film), which is physically impossible.

FIG. 3 shows an example in which the center thickness of film 24 is set to 0.7 mm, and the lens and the film each have a refractive index of 1.53. Examples of parameters of such a lens-film combination are provided in Tables 6-10, which are presented in the Appendix to the specification. Again, it is noted that some of the dimensions are negative, which is physically impossible. This example is nevertheless presented in order to convey the point that indeed it is impossible to construct a lens-film combination with certain constraints.

Table 6 (presented in the Appendix) indicates the parameters for the outer (convex) surface 42 of film 24, and the center thickness of the film.

Table 7 (presented in the Appendix) indicates the edge thickness of film 24, assuming a film diameter of 60 mm. It shows that when applying a center thickness of 0.7 mm (shown in Table 6) then even at ±30 mm the edge thickness is negative, indicating that it is impossible to manufacture a film with such characteristics.

Table 8 (presented in the Appendix) indicates the edge thickness of film 24, assuming a film diameter of 70 mm. Table 8 shows that, at a film diameter of 70 mm and a center thickness of 0.7 mm, the edge thickness is again negative, indicating that it is impossible to manufacture a film with such characteristics.

Table 9 (presented in the Appendix) indicates the convex radius of surface 44 of single-focus lens 22 as well as the center thickness of lens 22, with the lens having a prescription of −1.75 Diopters. As noted above, if the lens has a base 4.00 Diopters concave curvature, then in order to provide a −1.75 Diopters prescription, the lens needs to have a convex curvature of 2.25 Diopters. Using the thin-lens equation, for a lens having a refractive index of 1.53, the radius may be approximated by dividing 530 mm by the convex curvature. Accordingly, the radius for the convex side will be 530/2.25=235.56 mm.

Table 10 (presented in the Appendix) indicates the center thickness as well as the edge thickness, of the lens-film combination in two cases: (a) for a lens-film diameter of 60 mm, and (b) for a lens-film diameter of 70 mm. Again, it may be observed that the edge thickness increases as the diameter increases. It is noted that Table 10 is theoretical, since in some cases the total thickness is made up of a positive thickness (for the single-focus lens) and a negative thickness (for the film), which is physically impossible.

As indicated by the data shown in Tables 1-10, it is typically the case that if film 24 is designed such that its far-vision corrective portion 26 is a plano lens, the result is that (a) certain desired combinations of center thickness and lens diameters are physically impossible or practically unfeasible, (b) certain lens-film combinations require large center thicknesses, particularly in lenses having larger diameters (in order to avoid unfeasibly small or negative edge thicknesses), and/or (c) the film has a substantially non-uniform thickness, with a structure of a typical positive-prescription lens.

Figure 4:
FIG. 4 is a schematic illustration of a cross-section of a lens-film combination, in which the single-focus lens and the film each provide a portion of the far-vision corrective optical power, in accordance with some applications of the present invention.

Example of a Lens-Film Combination in which a Portion of the Far-Vision Corrective Optical Power is Provided by the Film Referring now to FIG. 4, in accordance with some applications of the present invention, film 24 is designed such that the film provides optical correction for far-vision. To compensate for this, the optical power of the far-vision correction that is provided by single-focus lens 22 is different than (e.g., lower than) the overall far-vision correction that is required for the desired overall prescription. For example, if the desired far-vision optical power of the lens-film combination is −1.50 Diopters, then single-focus lens 22 may provide −0.50 Diopters of the far-vision optical power of the lens-film combination, and film 24 may provide the remaining −1.00 Diopters of the far-vision optical power.

Typically, the amount of far-vision optical power that is assigned to film 24 is determined such as to result in the film having a substantially uniform thickness. For example, if the additive correction in the near-vision portion is +2.00 Diopters, then, in order to balance the thickness of film 24, the film may be configured to provide −1.00 Diopters of optical power in the far-vision portion, as in the above example.

It is noted that in some cases, additional considerations may result in the optical power that is assigned to the film in the far-vision portion being such that the thickness of the film is not uniform. For example, another consideration is that it is undesirable for the film to have an uncommon optical power in the far-vision portion (e.g., an optical power that isn't an integer multiple of 0.25 Diopters), since this would mean that the film could not be combined with an off-the-shelf lens such as to produce an overall far-vision correction that is a common optical power. For example, it may be the case that in order to provide a given additive optical power in the near-vision portion of film, the thickness of the film would be uniform if the optical power of the far-vision portion were set to −1.34 Diopters. However, in such cases, the optical power of the far-vision portion would typically be set to −1.25 Diopters, or −1.5 Diopters instead, due to the above considerations.

Reference is again made to FIG. 4, which is a schematic illustration of a cross-section of a lens-film combination, in which single-focus lens 22 and film 24 each provide a portion of the far-vision corrective optical power, in accordance with some applications of the present invention. The cross-section shown in FIG. 4 is taken along the vertical center line of the lens-film combination shown in FIG. 1 (i.e., along the line at which x=0 in FIG. 1). FIG. 4 shows an example in which the thickness of film 24 at its center (i.e., its center thickness) is 0.7 mm, and the lens and the film each have a refractive index of 1.53. Examples of parameters of such a lens-film combination are provided in Tables 11-15, which are presented in the Appendix to the specification.

Table 11 (presented in the Appendix) indicates the parameters for the outer (convex) surface 42 of film 24, and the center thickness of the film.

Table 12 (presented in the Appendix) indicates the edge thickness of film 24, assuming a film diameter of 60 mm. Table 13 indicates the edge thickness of film 24, assuming a film diameter of 70 mm. As shown, the edge thickness in both scenarios is reasonable and well above the 0.3 mm threshold that makes the film feasible from a manufacturing perspective.

Table 14 (presented in the Appendix) indicates the convex radius of surface 44 of single-focus lens 22 as well as the center thickness of the lens, for a single-focus lens having a prescription of −1.00 Diopters. If the single-focus lens has a base 4.00 Diopters concave curvature, then in order to provide a −1.00 Diopters prescription, the lens needs to have a convex curvature of 3.00 Diopters. Using the thin-lens equation, for a lens having a refractive index of 1.53, the radius may be approximated by dividing 530 mm by the convex curvature. Accordingly, the radius for the convex side will be 530/3=176.67 mm.

Table 15 (presented in the Appendix) indicates the center thickness as well as the edge thickness, of the lens-film combination in two cases: (a) for a lens-film diameter of 60 mm, and (b) for a lens-film diameter of 70 mm. As indicated, both in Tables 11-15 as well as in FIG. 4, designing film 24 in the above-described manner, results in both film 24 and the lens-film combination having a more uniform thickness, and the manufacturing of the lens-film combination at a diameter of 70 mm becomes possible.

Advantages of Having a Portion of the Far-Vision Corrective Optical Power be Provided by the Film In accordance with FIGS. 2-4 and the descriptions thereof, using film 24 to provide a portion of the far-vision correction (as shown in FIG. 4) provides a number of advantages relative to if the entire far vision correction is provided solely by the single-focus lens (as shown in FIGS. 2 and 3). If the film is used to provide the near-vision and progressive functionalities of the combination without providing any of the far-vision correction, then (even after performing industry-standard prism-thinning procedures, by removing a prism from the film), the film would have the structure of a typical positive-prescription lens. Such a lens is typically thinner its edges and thicker at its center, and the larger the diameter of the lens (or the film, in this case) the thicker the center of the lens. By contrast, when the film is used to provide some of the far vision correction (in accordance with some applications of the present invention), the film is typically designed to have a more uniform thickness, as described in more detail hereinbelow. Further typically, the overall lens-film combination is designed to have a thinner overall thickness than if the entire far vision correction were to be provided by the lens. Still further typically, the overall lens-film combination is designed to have a relatively uniform thickness across the area of the lens-film combination, such that even if the diameter of the lens-film combination increases, the thickness of the combination does not increase substantially at either its edges or at its center. For cosmetic reasons, all of the features of the lens-film combination described above are typically desirable. In addition, such features are typically desirable, in order to provide functional eyebrow clearance and to provide compatibility of the lens-film combination with the widest possible diversity of frame styles, shapes and sizes.

It is noted that the issue of the overall thickness of the progressive lens as well as the uniformity of the thickness is particularly important in a progressive lens that includes a lens-film combination as described herein. By virtue of the film having a more uniform thickness, it is typically possible to manufacture the film using a melted thermoplastic material and injection molding techniques, which would otherwise be difficult to implement. This is because if the film were to have the structure of a typical positive-prescription lens (i.e., thinner at its edges and thicker at its center), the mold cavity would have narrow edges and a wider center. The flow profile of the thermoplastic material flowing through such a cavity is likely to create stress marks, which will remain after the material cools down and thus be rendered unacceptable for ophthalmic applications. Moreover, in order to attain a reasonable thickness at the center of the film, the inlet into the cavity needs to be very narrow, and it is typically challenging to inject the melted thermoplastic material through a narrow inlet. By contrast, the mold cavity that is used to manufacture the film of the present application (which has substantially uniform thickness) is defined by substantially parallel cavity walls. A thermoplastic material will typically flow smoothly through such a cavity, such that the film will be produced without stress marks. For some applications, the film having a more uniform thickness facilitates simpler manufacturing of the film when using other manufacturing methods, such as casting and/or stamping methods (e.g., using thermoplastic materials and/or thermosetting materials).

Therefore, in accordance with some applications of the present invention, the far-vision corrective portion of the film is configured to provide a portion of the far-vision correction of the overall lens-film combination, such that the thickness of the film is substantially uniform. For some applications, a ratio of a center thickness of the film to an edge thickness of the film is between 1:2 and 2:1, when a diameter of the film is greater than or equal to 70 mm. For some applications, a ratio of a center thickness of the film to an edge thickness of the film is between 1:1.6 and 1.6:1, when a diameter of the film is greater than or equal to 40 mm.

For some applications, the edge thickness of the film is at least 0.1 mm (e.g., at least 0.3 mm). For some applications, the edge thickness of the film is at least 0.3 mm, even when the center thickness of the film is less than or equal to 0.7 mm, and/or even when the diameter of the film is greater than or equal to 70 mm. For some applications, the film includes a thermoplastic material, and the edge thickness of the film being greater than 0.1 mm (e.g., greater than 0.3 mm) facilitates manufacture of the film using injection molding of the thermoplastic material when the thermoplastic material is in melted form. For example, the edge thickness of the film being greater than 0.1 mm (e.g., greater than 0.3 mm) may facilitate manufacture of the film using injection molding, as described above, and without introducing stress marks in the material.

It is noted that, modifying the optical design of film to provide optical power in the far-vision portion, as described hereinabove, may introduce a horizontal prism, which is typically undesirable and may cause a strabismus effect. Therefore, typically, lens 22 and/or film 24 is configured to provide a compensating horizontal prism.

Certain advantages of having the film provide a portion of the far-vision corrective optical power of a lens-film combination were described above, by comparing the example shown in FIG. 4 to the examples shown in FIGS. 2 and 3. While these advantages are noted, the scope of the present application includes lens-film combinations in which all of the far-vision corrective optical power is provided solely by the single-focus lens, or provided solely by the film. As noted, some of the examples described with reference to FIGS. 2 and 3 are physically impossible. However, the scope of the present application includes a lens-film combinations in which all of the far-vision corrective optical power is provided by the single-focus lens, in accordance with the general principles described with reference to FIGS. 2 and 3.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

Appendix—Tables 1-15

Tables 1-5 Relate to the Example Shown in FIG. 2

TABLE 1

| Film 24 | |
|---|---|
| Convex curvature [Diopters] | 4.00 |
| Convex Radius [mm] | 132.50 |
| Center Thickness [mm] | 1.10 |

TABLE 2

| Film 24 edge thickness [mm] | |
|---|---|
| Edge thickness at y = 30 | 0.34 |
| Edge thickness at y = −30 | 0.32 |
| Average edge thickness | 0.33 |

TABLE 4

| Single-focus lens 22 | |
|---|---|
| Concave curvature [Diopters] | 4.00 |
| Prescription [Diopters] | −1.75 |
| Convex curvature [Diopters] | 2.25 |
| Convex Radius [mm] = | 235.56 |
| Center thickness [mm] = | 1.30 |

TABLE 5

| The combined lens-film geometry | | |
|---|---|---|
| Diameter [mm] | Center Thickness [mm] = | 2.40 |
| 60 | Edge thickness at y = 30 [mm] | 3.16 |
|  | Edge thickness at y = −30 [mm] | 3.14 |
| 70 | Edge thickness at y = 35 [mm] | 3.57 |
|  | Edge thickness at y = −35 [mm] | 3.26 |

TABLE 3

| | |
|---|---|
| Edge thickness at y = 35 | 0.18 |
| Edge thickness at y = −35 | −0.13 |
| Average edge thickness | 0.02 |

Tables 6-10 Relate to the Example Shown in FIG. 3

TABLE 6

Film 24

| | |
|---|---|
| Convex curvature [Diopters] | 4.00 |
| Convex Radius [mm] | 132.50 |
| Center thickness [mm] | 0.70 |

TABLE 7

Film 24 edge thickness [mm]

| | |
|---|---|
| Edge thickness at y = 30 | −0.06 |
| Edge thickness at y = −30 | −0.09 |
| Average edge thickness | −0.07 |

TABLE 9

Single-focus lens 22

| | |
|---|---|
| Concave curvature [Diopters] | 4.00 |
| Prescription [Diopters] | −1.75 |
| Convex curvature [Diopters] | 2.25 |
| Convex Radius [mm] | 235.56 |
| Center thickness [mm] | 1.3 |

TABLE 10

The combined lens-film geometry

| Diameter [mm] | Center Thickness [mm] | 2 |
|---|---|---|
| 60 | Edge thickness at y = 30 [mm] | 2.76 |
| | Edge thickness at y = −30 [mm] | 2.74 |
| 70 | Edge thickness at y = 35 [mm] | 3.17 |
| | Edge thickness at y = −35 [mm] | 2.86 |

TABLE 8

| | |
|---|---|
| Edge thickness at y = 35 | −0.22 |
| Edge thickness at y = −35 | −0.53 |
| Average edge thickness | −0.38 |

Tables 11-15 Relate to the Example Shown in FIG. 4

TABLE 11

Film 24

| | |
|---|---|
| Convex curvature [Diopters] | 4.00 |
| Convex Radius [mm] | 132.50 |
| Center thickness [mm] | 0.70 |

TABLE 12

Film 24 edge thickness [mm]

| | |
|---|---|
| Edge thickness at y = 30 | 0.88 |
| Edge thickness at y = −30 | 0.85 |
| Average edge thickness | 0.86 |

TABLE 14

Single-focus lens 22

| | |
|---|---|
| Concave curvature [Diopters] | 4.00 |
| Prescription [Diopters] | −1.00 |
| Convex curvature [Diopters] | 3.00 |
| Convex Radius [mm] | 176.67 |
| Center thickness [mm] | 1.30 |

TABLE 15

The combined lens-film geometry

| Diameter [mm] | Center Thickness [mm] = | 2 |
|---|---|---|
| 60 | Edge thickness at y = 30 [mm] | 3.05 |
| | Edge thickness at y = −30 [mm] | 3.02 |
| 70 | Edge thickness at y = 35 [mm] | 3.58 |
| | Edge thickness at y = −35 [mm] | 3.24 |

TABLE 13

| | |
|---|---|
| Edge thickness at y = 35 | 1.07 |
| Edge thickness at y = −35 | 0.73 |
| Average edge thickness | 0.90 |

The invention claimed is:

1. Apparatus comprising:
   a progressive lens that is configured to provide a far-vision correction and a near-vision correction, the progressive lens comprising:
      a single-focus, far-vision corrective lens that is configured to provide only a portion of the far-vision correction; and
      a film coupled to the single-focus, far-vision corrective lens, the film being configured to define:
         a far-vision corrective portion that is configured to provide a remainder of the far-vision correction;
         a near-vision corrective portion that is configured to provide additive near-vision correction; and
         an intermediate portion in which the film transitions between the far-vision corrective portion and the near-vision corrective portion,
      wherein the far-vision corrective portion of the film is configured to provide a portion of the far-vision correction such that an edge thickness of the film is at least 0.1 mm.

2. The apparatus according to claim 1, wherein the single-focus, far-vision corrective lens is rigid.

3. The apparatus according to claim 1, wherein the film comprises a flexible film.

4. The apparatus according to claim 1, wherein the far-vision corrective portion of the film is configured to provide a portion of the far-vision correction such that a thickness of the film is substantially uniform.

5. The apparatus according to claim 1, wherein the far-vision corrective portion of the film is configured to provide a portion of the far-vision correction such that a ratio of a center thickness of the film to an edge thickness of the film is between 1:2 and 2:1, when a diameter of the film is greater than or equal to 70 mm.

6. The apparatus according to claim 1, wherein the far-vision corrective portion of the film is configured to provide a portion of the far-vision correction such that a ratio of a center thickness of the film to an edge thickness of the film is between 1:1.6 and 1.6:1, when a diameter of the film is greater than or equal to 40 mm.

7. The apparatus according to claim 1, wherein the far-vision corrective portion of the film is configured to provide a far-vision correction such that a far-vision correction that is provided by the single-focus, far-vision corrective lens is an integer multiple of 0.25 Diopters.

8. The apparatus according to claim 1, wherein the film is configured to be flexible under given conditions, and is configured to be rigid, such as to have characteristics of a rigid lens, under typical ambient conditions.

9. The apparatus according to claim 1, wherein the film is configured to be flexible above a given temperature, and is configured to be rigid, such as to have characteristics of a rigid lens, at a temperature of below 50 degrees Celsius.

10. The apparatus according to claim 1, wherein the far-vision corrective portion of the film is configured to provide a portion of the far-vision correction such that an edge thickness of the film is at least 0.3 mm.

11. The apparatus according to claim 10, wherein the far-vision corrective portion of the film is configured to provide a portion of the far-vision correction such that an edge thickness of the film is at least 0.3 mm, even when a center thickness of the film is less than or equal to 0.7 mm.

12. The apparatus according to claim 10, wherein the far-vision corrective portion of the film is configured to provide a portion of the far-vision correction such that an edge thickness of the film is at least 0.3 mm, even when a diameter of the film is greater than or equal to 70 mm.

13. The apparatus according to claim 10, wherein the far-vision corrective portion of the film is configured to provide a portion of the far-vision correction such that an edge thickness of the film is at least 0.3 mm, even when a center thickness of the film is less than or equal to 0.7 mm, and a diameter of the film is greater than or equal to 70 mm.

14. A method comprising:
  manufacturing a progressive lens that is configured to provide a far-vision correction and a near-vision correction, by:
    configuring a film to define:
      a far-vision corrective portion that is configured to provide a portion of the far-vision correction,
      a near-vision corrective portion that is configured to provide additive near-vision correction, and
      an intermediate portion in which the film transitions between the far-vision corrective portion and the near-vision corrective portion; and
    coupling the film to a single-focus, far-vision corrective lens that is configured to provide a remainder of the far-vision correction,
  wherein the far-vision corrective portion of the film is configured to provide a portion of the far-vision correction such that an edge thickness of the film is at least 0.1 mm.

15. The method according to claim 14, wherein the single-focus, far-vision corrective lens includes a rigid single-focus, far-vision corrective lens, and wherein coupling the film to the single-focus, far-vision corrective lens comprises coupling the film to the rigid single-focus, far-vision corrective lens.

16. The method according to claim 14, wherein the film includes a flexible film, and wherein coupling the film to the single-focus, far-vision corrective lens comprises coupling the flexible film to the single-focus, far-vision corrective lens.

17. The method according to claim 14, wherein configuring the film to define the far-vision corrective portion, the near-vision corrective portion, and the intermediate portion comprises configuring the film to have a thickness that is substantially uniform.

18. The method according to claim 14, wherein configuring the film to define the far-vision corrective portion, the near-vision corrective portion, and the intermediate portion comprises configuring the film such that a ratio of a center thickness of the film to an edge thickness of the film is between 1:2 and 2:1, when a diameter of the film is greater than or equal to 70 mm.

19. The method according to claim 14, wherein configuring the film to define the far-vision corrective portion, the near-vision corrective portion, and the intermediate portion comprises configuring the film such that a ratio of a center thickness of the film to an edge thickness of the film is between 1:1.6 and 1.6:1, even when a diameter of the film is greater than or equal to 40 mm.

20. The method according to claim 14, wherein configuring the film to define the far-vision corrective portion, the near-vision corrective portion, and the intermediate portion comprises configuring the film such that a far-vision correction that is provided by the single-focus, far-vision corrective lens is an integer multiple of 0.25 Diopters.

21. The method according to claim 14, wherein the film includes a film that is configured to be flexible under given conditions, and is configured to be rigid, such as to have characteristics of a rigid lens, under typical ambient conditions, and wherein coupling the film to the single-focus, far-vision corrective lens comprises coupling the film to the single-focus, far-vision corrective lens while the given conditions are applied to the film, such that the film is flexible.

22. The method according to claim 14, wherein the film includes a film that is configured to be flexible above a given temperature, and is configured to be rigid, such as to have characteristics of a rigid lens, at a temperature of below 50 degrees Celsius, and wherein coupling the film to the single-focus, far-vision corrective lens comprises coupling the film to the single-focus, far-vision corrective lens while the film is heated to above the given temperature, such that the film is flexible.

23. The method according to claim 14, wherein configuring the film to define the far-vision corrective portion, the near-vision corrective portion, and the intermediate portion comprises configuring the film such that the edge thickness of the film is at least 0.3 mm.

24. The method according to claim 23, wherein configuring the film to define the far-vision corrective portion, the near-vision corrective portion, and the intermediate portion comprises configuring the film such that the edge thickness of the film is at least 0.3 mm, even when a center thickness of the film is less than or equal to 0.7 mm.

25. The method according to claim 23, wherein configuring the film to define the far-vision corrective portion, the near-vision corrective portion, and the intermediate portion comprises configuring the film such that the edge thickness of the film is at least 0.3 mm, even when a diameter of the film is greater than or equal to 70 mm.

26. The method according to claim 23, wherein configuring the film to define the far-vision corrective portion, the near-vision corrective portion, and the intermediate portion comprises configuring the film such that the edge thickness of the film is at least 0.3 mm, even when a center thickness of the film is less than or equal to 0.7 mm, and a diameter of the film is greater than or equal to 70 mm.

* * * * *